(12) United States Patent
Wakao (10) Patent No.: US 7,930,548 B2
(45) Date of Patent: Apr. 19, 2011

(54) IMAGE VERIFICATION SYSTEM, IMAGE VERIFICATION APPARATUS, AND IMAGE VERIFICATION METHOD

(75) Inventor: Satoru Wakao, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 442 days.

(21) Appl. No.: 11/952,204

(22) Filed: Dec. 7, 2007

(65) Prior Publication Data

US 2008/0183770 A1    Jul. 31, 2008

Related U.S. Application Data (63) Continuation of application No. 10/320,388, filed on Dec. 17, 2002, now Pat. No. 7,308,577.

(30) Foreign Application Priority Data

Dec. 28, 2001    (JP) .................................. 2001-401663

(51) Int. Cl.
*H04L 9/32* (2006.01)
(52) U.S. Cl. ........ 713/176; 713/161; 713/187; 713/193; 726/17; 726/30; 380/201
(58) Field of Classification Search .................... 713/176
See application file for complete search history.

(56) References Cited

U.S. PATENT DOCUMENTS

| | | | |
|---|---|---|---|
| 4,656,474 A | 4/1987 | Mollier et al. ................. | 713/181 |
| 4,799,258 A | 1/1989 | Davies .......................... | 713/159 |
| 4,908,861 A | 3/1990 | Brachtl et al. ................. | 713/178 |
| 5,022,080 A | 6/1991 | Durst et al. ................... | 713/178 |
| 5,157,726 A | 10/1992 | Merkle et al. ................. | 713/176 |
| 5,499,294 A | 3/1996 | Friedman ........................ | 380/10 |
| 5,600,720 A | 2/1997 | Iwamura et al. .................. | 380/1 |
| 5,666,419 A | 9/1997 | Yamamoto et al. ............. | 380/28 |
| 5,844,961 A | 12/1998 | McEvoy et al. ............. | 378/98.8 |
| 5,875,249 A | 2/1999 | Mintzer et al. .................. | 380/54 |
| 5,898,779 A | 4/1999 | Squilla et al. ................. | 713/176 |
| 5,937,395 A | 8/1999 | Iwamura .......................... | 705/30 |
| 6,064,764 A | 5/2000 | Bhaskaran et al. ........... | 382/183 |

(Continued)

FOREIGN PATENT DOCUMENTS

CN             1264974            8/2000

(Continued)

OTHER PUBLICATIONS

Chinese Office Action issued Nov. 12, 2004 in Application No. 02160833.4 and English translation thereof.

(Continued)

*Primary Examiner* — Matthew B Smithers
*Assistant Examiner* — Shewaye Gelagay
(74) *Attorney, Agent, or Firm* — Fitzpatrick, Cella, Harper & Scinto (57) ABSTRACT

To provide an image verification system which verifies whether image data has been altered. The image verification system has an image generation apparatus, a first verification apparatus, a second verification apparatus, etc. The image generation apparatus generates image data, a hash value of the image data, and first verification data for the image data. The first verification apparatus verifies whether the image data has been altered, by using the hash value and first verification data. The first verification apparatus generates second verification data (a digital signature) for the image data if the image data has not been altered. The second verification apparatus verifies whether the image data has been altered, by using the image data and second verification data.

14 Claims, 7 Drawing Sheets

U.S. PATENT DOCUMENTS

| | | | | |
|---|---|---|---|---|
| 6,088,454 | A | 7/2000 | Nagashima et al. | 380/286 |
| 6,269,446 | B1 | 7/2001 | Schumacher et al. | 713/176 |
| 6,332,193 | B1 | 12/2001 | Glass et al. | 713/170 |
| 6,513,118 | B1 | 1/2003 | Iwamura | 713/176 |
| 6,587,949 | B1 | 7/2003 | Steinberg | 713/193 |
| 6,611,599 | B2 | 8/2003 | Natarajan | 380/203 |
| 6,642,956 | B1 | 11/2003 | Safai | 348/222.1 |
| 6,769,061 | B1 | 7/2004 | Ahern | 713/176 |
| 6,826,315 | B1 | 11/2004 | Wickes | 382/305 |
| 6,829,367 | B1 | 12/2004 | Toyokawa et al. | 382/100 |
| 6,889,324 | B1 | 5/2005 | Kanai et al. | 713/176 |
| 6,968,058 | B1 * | 11/2005 | Kondoh et al. | 380/200 |
| 7,000,112 | B1 | 2/2006 | Oishi | 713/176 |
| 7,139,407 | B2 | 11/2006 | Wakao | 382/100 |
| 7,162,637 | B2 | 1/2007 | Wakao | 713/176 |
| 7,171,021 | B2 | 1/2007 | Yoshida | 382/100 |
| 2001/0021251 | A1 | 9/2001 | Kasai et al. | 380/201 |
| 2003/0011684 | A1 | 1/2003 | Narayanaswami et al. | 348/207.99 |
| 2003/0097568 | A1 | 5/2003 | Choi et al. | 713/176 |
| 2003/0123699 | A1 | 7/2003 | Wakao et al. | 380/200 |
| 2003/0123701 | A1 | 7/2003 | Dorrell et al. | 382/100 |
| 2003/0126443 | A1 | 7/2003 | Wakao | |
| 2003/0126444 | A1 | 7/2003 | Wakao et al. | |
| 2004/0071311 | A1 | 4/2004 | Choi et al. | 382/100 |

FOREIGN PATENT DOCUMENTS

| | | |
|---|---|---|
| EP | 0 952 728 A | 10/1999 |
| EP | 1091285 * | 4/2001 |
| EP | 1 209 847 A | 5/2002 |
| FR | 2 772 530 | 12/1997 |
| JP | 9-200730 | 7/1997 |
| JP | 10-32570 | 2/1998 |
| JP | 10-274927 | 10/1998 |
| JP | 11-308564 | 11/1999 |
| JP | 11-340965 | 12/1999 |
| JP | 2000-215379 | 8/2000 |
| JP | 2000-216773 | 8/2000 |
| JP | 2001-36856 | 2/2001 |
| JP | 2001-100632 | 4/2001 |

OTHER PUBLICATIONS

Feb. 21, 2007 Office Action in European Application No. 02 258 767.9-1522.

Yeung et al. "An Invisible Watermarking Technique for Image Verification", IEEE, 1997, pp. 680-683.

Wong, Ping Wah, "A Public Key Watermark for Image Verification and Authentication", IEEE, 1998, pp. 455-459.

Kahng et al., "Watermarking Techniques for Intellectual Property Protection", DAC, Jun. 15-19, 1998, pp. 776-781.

Memon et al., "Protecting Digital Media Content", Communications of the ACM, Jul. 1998, pp. 35-43.

Friedman, G.L., "The Trustworthy Digital Camera:Restoring Credibility to the Photographic Image", IEEE, Nov. 1993, pp. 905-910.

R.L. Rivest, et al. "A Method of Obtaining Digital Signatures and Public-key Cryptosystems", Comm. of ACM, 1987, pp. 120-126.

H.C. Williams, "A Modification of the RSA Public-Key Encryption Procedure" IEEE Trans. Inf. Theory, IT-26, 6, 1980, pp. 726-729.

A. Shamir, et al. "On the Security of the Merkle-Hellman Cryptographic Scheme", IEEE Trans. Inf. Theory, IT-26, 3, 1980, pp. 339-340.

S. Goldwasser, et al. "Strong Signature Schemes", ACM Symp. on Theory of Computing, 1983, pp. 431-439.

H. Ong, et al., "An Efficient Signature Scheme Based on Quadratic Equations", ACM Symp. on Theory of Computing, 1984, pp. 208-216.

Ivan Bjerre Damgard, "Practical and Provably Secure Release of a Secret and Exchange of Signatures", Aarhus Unv., Mathematical Inst. pp. 200-217.

Amos Fiat, et al., "How to Prove Yourself: Practical Solutions to Identification and Signature Problems", The Weizmann Inst. Sci., pp. 186-194.

Eiji Okamoto, ID-Based Key Distribution System, C&C Information Technology Res. Labs., NEC Corporation, p. 15, May 1989.

S. Goldwasser, et al. "A 'Paradoxical' Solution to the Signature Problem", ACM Symp. On Foundation of Computer Science, 1984, pp. 441-448.

David Chaum, et al., "Group Signatures", CWI Centre for Mathematics and Computer Science, Amsterdam, Netherlands, 1998, pp. 257-265.

Rieger, B. et al., "Digital Image Recording for Court-related Purposes", 1999 Proceedings, IEEE 33rd Annual1999 International Carnahan Conference on Security Technology, Madrid, Spain, Oct. 5-7, 1999, pp. 262-279.

Witzke E.L., et al., "Key Management for Large Scaled End-to-End Encryption", Proceedings, Institute of Electrical and Electronics Engineers 1993 International Carnahan Conerence on Security Technology, Ottawa, Ont.., Oct. 12, 1994, pp. 76-79.

* cited by examiner

| UNIQUE ID | COMMON INFORMATION Kc | SECRET INFORMATION Ks |
|---|---|---|
| 001 | 0x1111 | 0x2222 |
| 002 | ...... | ...... |
| ...... | ...... | ...... |

FIG. 7B

| UNIQUE ID | PUBLIC INFORMATION Kp |
|---|---|
| 001 | 0x3333 |
| 002 | ...... |
| ...... | ...... |

IMAGE VERIFICATION SYSTEM, IMAGE VERIFICATION APPARATUS, AND IMAGE VERIFICATION METHOD

The present application is a continuation of U.S. application Ser. No. 10/320,388 filed Dec. 17, 2002, pending.

BACKGROUND OF THE INVENTION

1. Field of the Invention

The present invention relates to a system, apparatus, method, etc. which verify whether image data generated by an image generation apparatus such as a digital camera has been altered.

2. Related Background Art

Recently, digital cameras which store optical images of subjects by digitizing them have been put into practical use.

Image data created by a digital camera can be captured easily into a personal computer, but at the same time there is the problem that it can be altered easily on the personal computer. Consequently, image data created by a digital camera has the problem that it has lower reliability than silver halide photographs and is not very admissible as evidence. Therefore, digital camera systems have recently been proposed which have a capability to attach a digital signature to image data created by a digital camera. Conventional digital camera systems are disclosed, for example, in U.S. Pat. No. 5,499,294 and Japanese Patent Laid-Open No. 9-200730.

Normally, public-key cryptography such as RSA encryption is used to generate digital signatures. However, the public-key cryptography such as RSA encryption, which involves exponent operations and multiplication/division operations, is not good at high-speed processing and requires hundreds to thousands of times as much processing time as common-key cryptography such as DES. Thus, there is the problem that conventional digital cameras with their limited computational resources have great difficulty in generating digital signatures. Although there is a way to improve the performance of the computational resources of digital signatures extensively so that digital signatures can be generated easily, but this is not desirable because such a method will greatly increase the costs of the digital cameras themselves.

SUMMARY OF THE INVENTION

The present invention has been achieved to solve the above-described problems. Its object is to provide a capability to verify whether image data generated by an image generation apparatus such as a digital camera has been altered while reducing the costs of the apparatus.

An image verification system according to a preferred embodiment of the present invention includes an image generation apparatus, information processor, and first image verification apparatus, wherein: the above described image generation apparatus comprises image generation means for generating image data, hash value generation means for generating a hash value of the above described image data, and first verification data generation means for generating first verification data using the above described hash value and common information; the above described image generation apparatus sends the above described hash value and the above described first verification data to the above described first image verification apparatus; and the above described first image verification apparatus comprises first verification means for verifying whether the above described image data has been altered, by using the above described hash value, the above described first verification data, and the above described common information, and second verification data generation means for generating second verification data for the above described image data using the above described hash value and secret information if the above described image data has not been altered.

An image verification apparatus according to a preferred embodiment of the present invention includes: verification means for verifying whether image data generated by an image generation apparatus has been altered, by using a hash value of the above described image data, first verification data, and common information; and verification data generation means for generating second verification data for the above described image data using the above described hash value and secret information if the above described image data has not been altered.

An image verification method according to a preferred embodiment of the present invention includes: a verification step of verifying whether image data generated by an image generation apparatus has been altered, by using a hash value of the above described image data, first verification data, and common information; and a verification data generation step of generating second verification data for the above described image data using the above described hash value and secret information if the above described image data has not been altered.

Still other objects of the present invention, and the advantages thereof, will become fully apparent from the following detailed description of the embodiments.

BRIEF DESCRIPTION OF THE DRAWINGS

FIG. 6 composed of FIG. 6A and FIG. 6B is a diagram illustrating procedures of the image verification system according to this embodiment.

DETAILED DESCRIPTION OF THE PREFERRED EMBODIMENTS

A preferred embodiment of the present invention will be described below with reference to the drawings.

Figure 1:
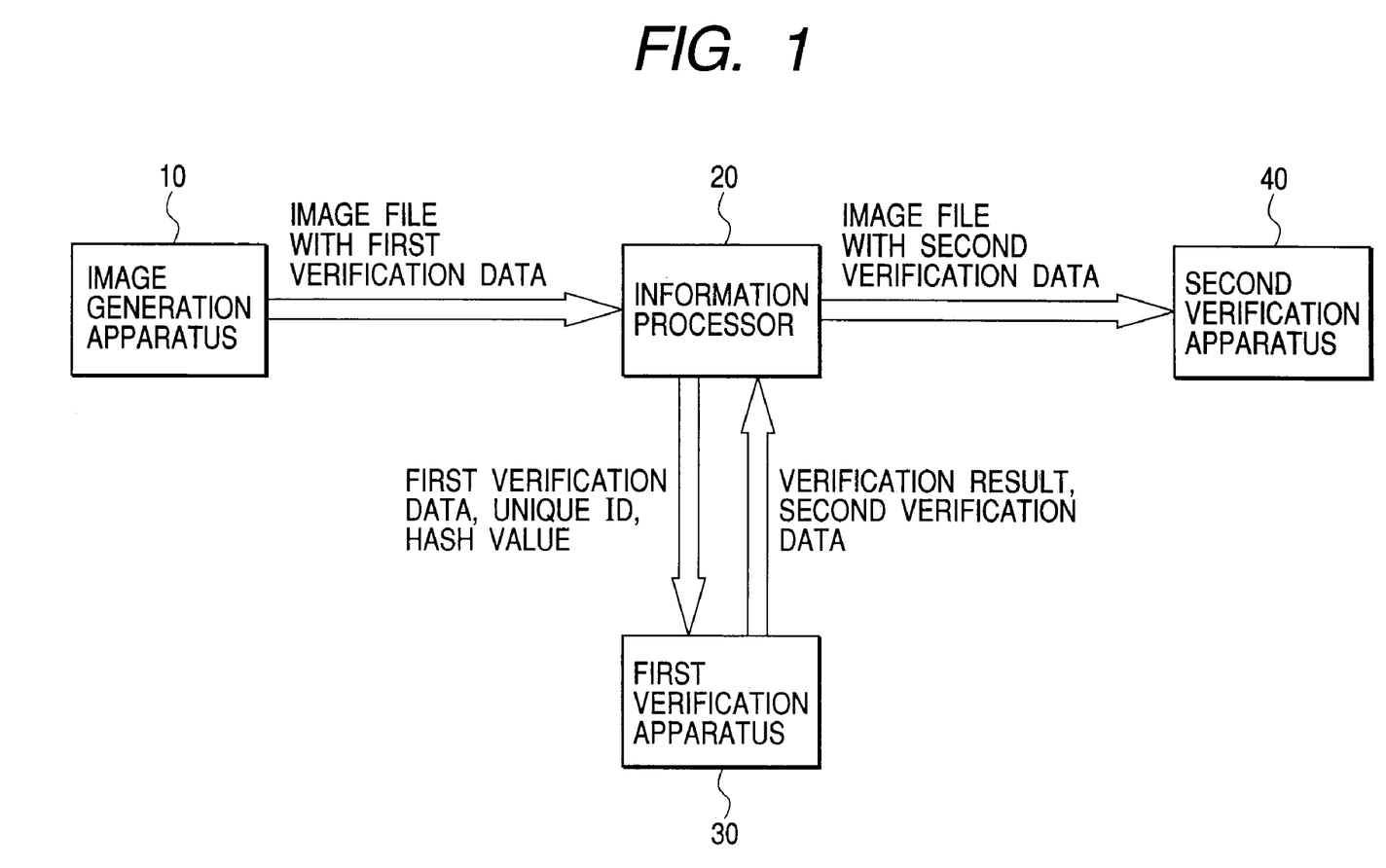
FIG. 1 is a diagram illustrating a configuration example of an image verification system according to this embodiment.

FIG. 1 is a diagram illustrating a configuration example of an image verification system according to this embodiment.

An image generation apparatus 10 has a capability to generate image data of subjects and a capability to generate an image file with first verification data. The image file with first verification data contains image data, first verification data for the image data, additional information about the image data, a unique ID of the image generation apparatus 10, and other data. The image generation apparatus 10 may be an imaging apparatus such as a digital camera, digital video camera, or scanner or an apparatus equipped with a camera unit. Also, the image generation apparatus 10 may be a facsimile machine, copier, or similar machine equipped with an image reading unit.

An information processor 20 has a capability to make a first verification apparatus 30 verify the image file with first verification data as well as a capability to generate an image file with second verification data. The image file with second verification data contains image data, second verification data for the image data, additional information about the image data, a unique ID of the image generation apparatus 10, and other data. The information processor 20 may be a personal computer or other information processor.

The first verification apparatus 30 has a capability to verify whether image data has been altered, by using the first verification data. Also the first verification apparatus 30 has a capability to generate second verification data for the image data if the image data has not been altered. The first verification apparatus 30 needs only to be capable of making common information Kc and secret information Ks (described later) difficult to be analyzed or leaked. Thus, the first verification apparatus 30 may be, for example, an IC card (or a storage medium with a microprocessor) or a server computer with the information processor 20 operating as a client. If the information processor 20 is a server computer, the first verification apparatus 30 and information processor 20 are connected via a network such as a LAN, a wireless LAN, a WAN, or the Internet.

The second verification apparatus 40 has a capability to verify whether image data has been altered, by using the second verification data. The second verification apparatus 40 may be a personal computer or other information processor.

Figure 2:
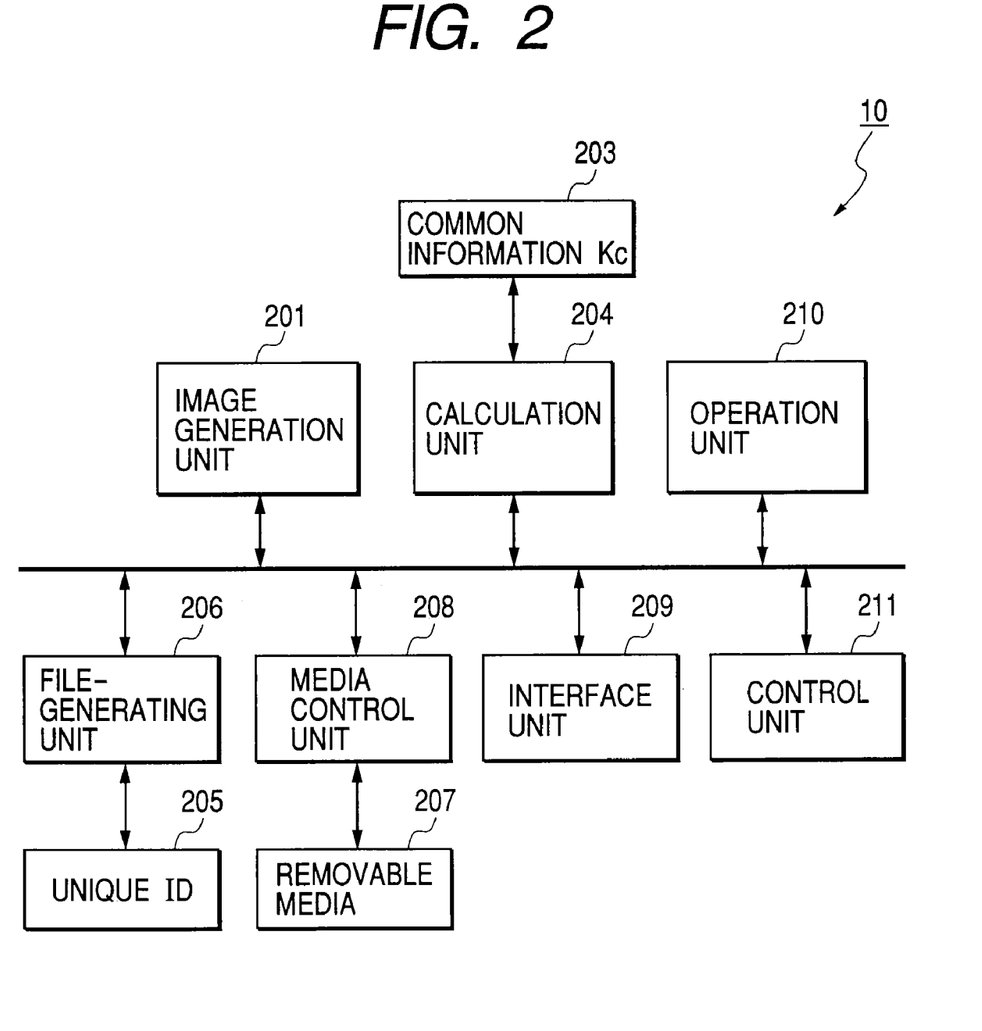
FIG. 2 is a block diagram illustrating main functional components of an image generation apparatus 10 according to this embodiment.

FIG. 2 is a block diagram illustrating main functional components of the image generation apparatus 10 according to this embodiment.

Reference numeral 201 denotes an image generation unit which comprises a photosensor—such as a CCD (charge-coupled device)—and microprocessor and generates image data I of a subject.

Reference numeral 203 denotes a memory which stores the common information Kc. The common information Kc corresponds to a common key in common-key cryptography (DES, Rinjdael, etc.).

Reference numeral 204 denotes a calculation unit which performs first and second calculation processes. The first calculation process generates a hash value (also called a message digest or digest data) H11 of the image data I using a hash function HF1. The second calculation process converts the hash value H11 generated in the first calculation process into first verification data V11 using the common information Kc obtained from the memory 203. The first verification data V11 is equivalent to MAC (Message Authentication Code) in the image data I. Incidentally, the hash function HF1 may be an MD-2, MD-5, SHA-1, RIPEMD-128, RIPEMD-160, or other hash function.

Reference numeral 205 denotes a memory which stores a unique ID unique to the image generation apparatus 10 (e.g., the production number or serial number of the image generation apparatus 10). The unique ID is attached to the image file with first verification data.

Reference numeral 206 denotes an image file-generating unit which generates the image file IF1 with first verification data. The image file IF1 with first verification data contains the image data I in its data section and contains the hash value H11 of the image data I, first verification data V11 of the image data I, additional information about the image data I, the unique ID of the image generation apparatus 10, and other data in its header section. The file type of the image file IF1 with first verification data may be JFIF (JPEG File Interchange Format), TIFF (Tagged Image File Format), or GIF (Graphics Interchange Format), or any of their extended versions, or other file format.

Reference numeral 207 denotes a removable medium (removable recording medium) such as a magnetic disk, optical disk, or memory card, which stores the image file IF1 with first verification data.

Reference numeral 208 denotes a media control unit which has a capability to write the image file IF1 with first verification data into the removable medium 207 and a capability to read the image file IF1 with first verification data from the removable medium 207.

Reference numeral 209 denotes an interface unit which sends the image file IF1 with first verification data from the removable medium 207 to the information processor 20.

Reference numeral 210 denotes an operation unit which is equipped with switches and the like for giving instructions to photograph a subject (object), generate its image data, or read the image data.

Reference numeral 211 denotes a control unit which comprises a memory and microcomputer for executing control programs stored in the memory and controls operation of various parts of the image generation apparatus 10. In particular, the memory in the control unit 211 stores a program which controls procedures of the image generation apparatus 10 described later with reference to FIGS. 6A and 6B.

Figure 3:
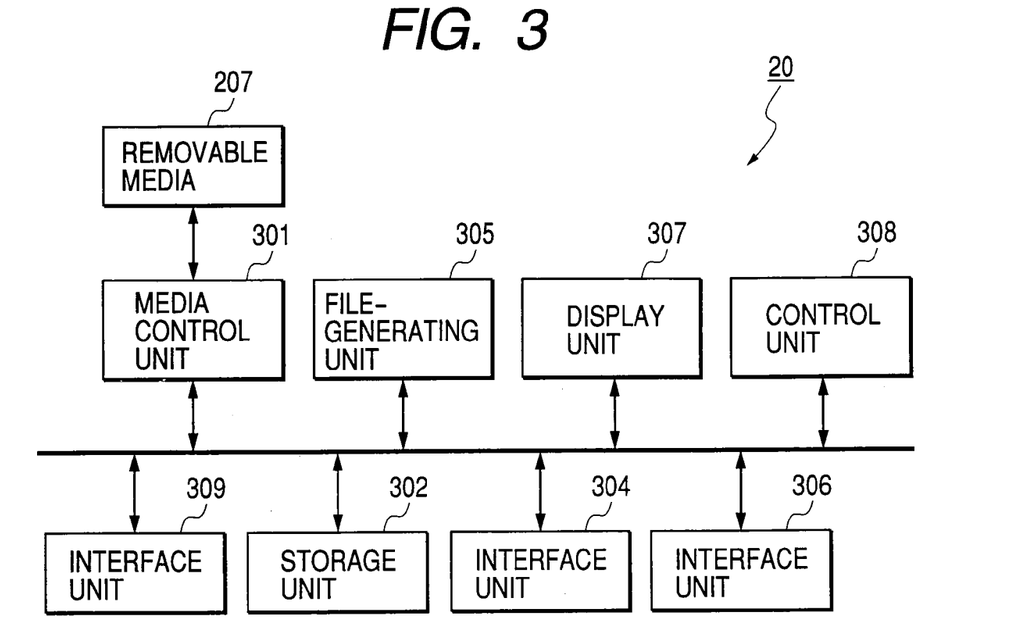
FIG. 3 is a block diagram illustrating main functional components of an information processor 20 according to this embodiment.

FIG. 3 is a block diagram illustrating main functional components of the information processor 20 according to this embodiment;

Reference numeral 301 denotes a media control unit which reads the image file IF1 with first verification data from the removable medium 207.

Reference numeral 309 denotes an interface unit which receives the image file IF1 with first verification data sent from the image generation apparatus 10.

Reference numeral 302 denotes a storage unit which stores the image file IF1 with first verification data and the image file IF2 with second verification data.

Reference numeral 304 denotes an interface unit which has a capability to send the hash value H11, first verification data V11, and unique ID obtained from the image file IF1 with first verification data to the first verification apparatus 30, a capability to receive second verification data V2 sent from the first verification apparatus 30, and a capability to receive a verification result of the first verification apparatus 30. The second verification data V2 received by the interface unit 304 is attached to the image file IF2 with second verification data.

Reference numeral 305 denotes an image file-generating unit which generates the image file IF2 with second verification data. The image file IF2 with second verification data contains the image data I in its data section and contains the hash value H11 of the image data I, second verification data V2 of the image data I, additional information about the image data I, the unique ID of the image generation apparatus 10, and other data in its header section.

Reference numeral 306 denotes an interface unit which has a capability to send the image file IF2 with second verification data generated by the information processor 20 to an external apparatus.

Reference numeral 307 denotes a display unit which displays information about the verification result produced by the first verification apparatus 30.

Reference numeral 308 denotes a control unit which comprises a memory and microcomputer for executing control programs stored in the memory and controls various functions of the information processor 20. In particular, the memory in the control unit 308 stores a program which controls procedures of the information processor 20 described later with reference to FIGS. 6A and 6B.

Figure 4:
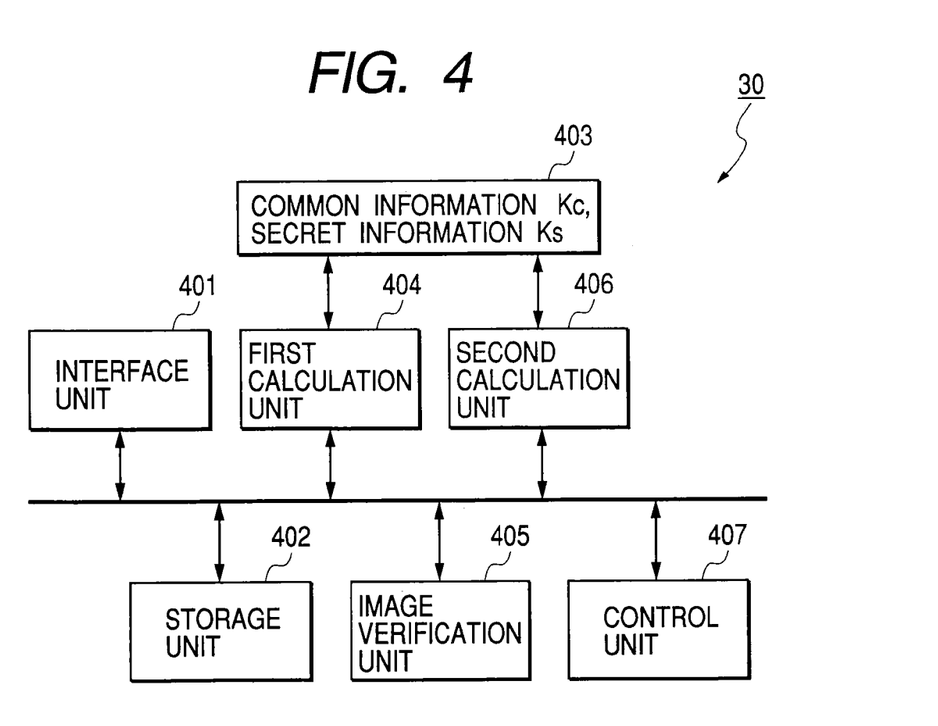
FIG. 4 is a block diagram illustrating main functional components of a first verification apparatus 30 according to this embodiment.

FIG. 4 is a block diagram illustrating main functional components of the first verification apparatus 30 according to this embodiment.

Reference numeral 401 denotes an interface unit which has a capability to receive the hash value H11, first verification data V11, and unique ID sent from the information processor 20, a capability to send the verification result of the first verification apparatus 30 to the information processor 20, and a capability to send the second verification data V2 generated by the first verification apparatus 30 to the information processor 20.

Reference numeral 402 denotes a storage unit which stores the hash value H11, first verification data V11, unique ID, and second verification data V2.

Figure 7A:
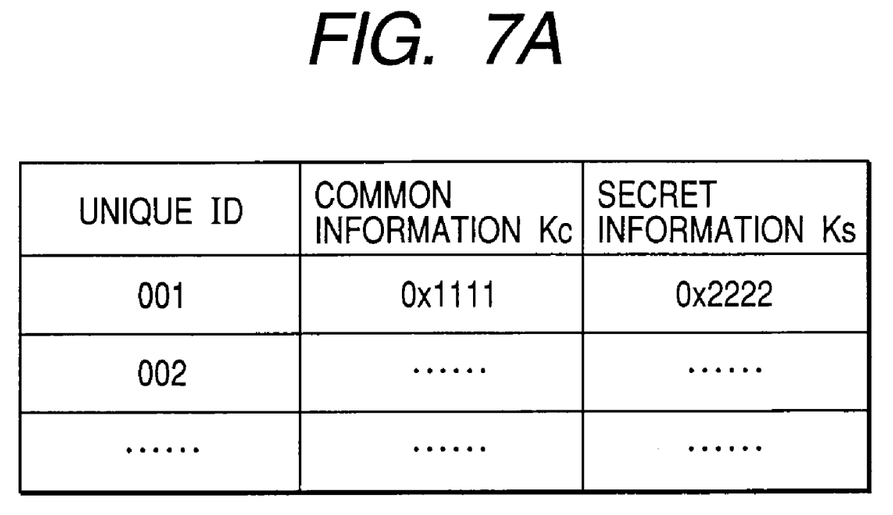
FIGS. 7A and 7B are diagrams showing examples of table T1 and table T2 respectively.

Reference numeral 403 denotes a memory which stores a table T1. An example of the table T1 is shown in FIG. 7A. The table T1 is a management table which manages a plurality of unique IDs, common information Kc corresponding to each of the unique IDs, and secret information Ks corresponding to each piece of common information Kc. For a unique ID of "001", for example, the common information Kc corresponding to the unique ID is "0x1111" and secret information Ks is "0x2222". The common information Kc and secret information Ks are kept secret by the first verification apparatus 30 and are not made open to the public. The secret information Ks is equivalent to a secret key in public-key cryptography (such as RSA encryption).

Reference numeral 404 denotes a first calculation unit which performs a calculation process to convert the hash value H11 into first verification data V12 using the common information Kc.

Reference numeral 405 denotes an image verification unit which verifies whether the image data I has been altered, by using the first verification data V11 and first verification data V12.

Reference numeral 406 denotes a second calculation unit which performs a calculation process to convert the hash value H11 into the second verification data V2 using the secret information Ks obtained from the memory 403. The second verification data V2 is equivalent to a digital signature in the image data I.

Reference numeral 407 denotes a control unit which comprises a memory and microcomputer for executing control programs stored in the memory and controls various functions of the first verification apparatus 30. In particular, the memory in the control unit 308 stores a program which controls procedures of the first verification apparatus 30 described later with reference to FIGS. 6A and 6B.

Figure 5:
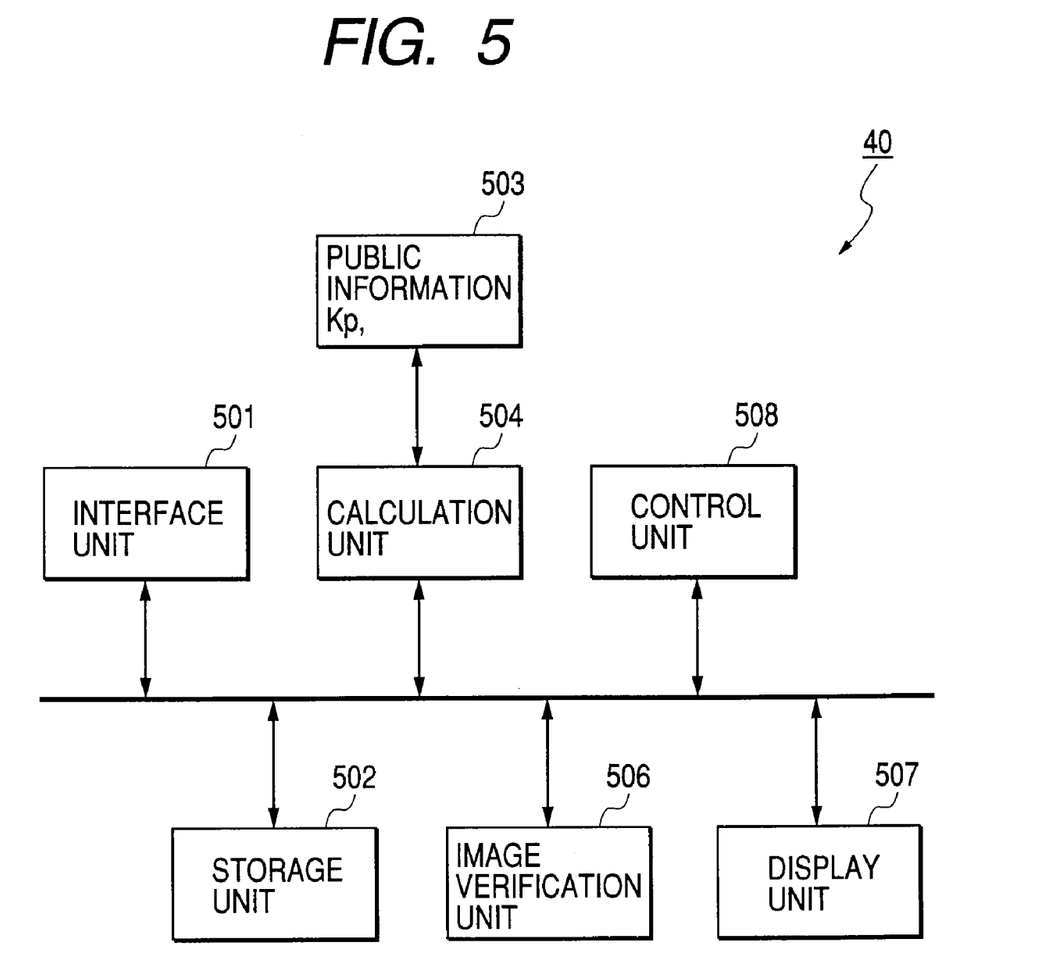
FIG. 5 is a block diagram illustrating main functional components of a second verification apparatus 40 according to this embodiment.

FIG. 5 is a block diagram illustrating main functional components of the second verification apparatus 40 according to this embodiment.

Reference numeral 501 denotes an interface unit which has a capability to receive the image file IF2 with second verification data from an external apparatus.

Reference numeral 502 denotes a storage unit which stores the image file IF2 with second verification data.

Figure 7B:
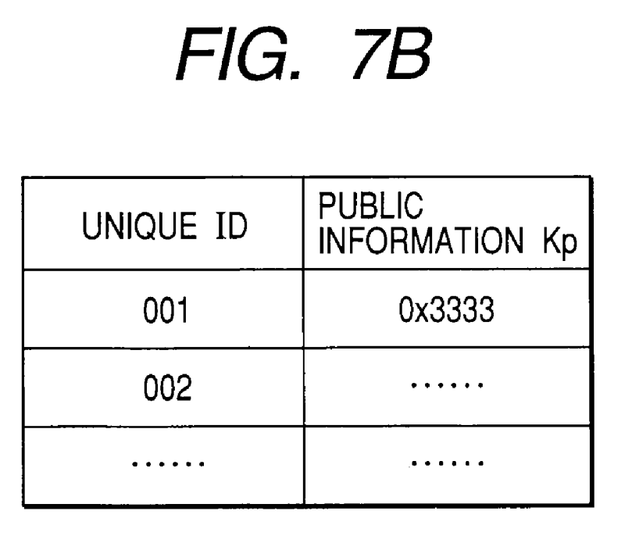

Reference numeral 503 denotes a memory which stores a table T2. An example of the table T2 is shown in FIG. 7B. The table T2 is a management table which manages a plurality of unique IDs and public information Kp corresponding to each of the unique IDs. For a unique ID of "001", for example, the public information Kp corresponding to the unique ID is "0x3333". The public information Kp is associated with the secret information Ks and is equivalent to a public key in public-key cryptography (such as RSA encryption).

Reference numeral 504 denotes a calculation unit which performs first and second calculation processes. The first calculation process converts the second verification data V2 into a hash value H12 using the public information Kp. The second calculation process generates a hash value H13 of the image data I using the hash function HF1.

Reference numeral 506 denotes an image verification unit which verifies whether the image data I has been altered, by using the hash value H12 and hash value H13 generated by the calculation unit 504.

Reference numeral 507 denotes a display unit which displays information about the verification result produced by the image verification unit 506.

Reference numeral 508 denotes a control unit which comprises a memory and microcomputer for executing control programs stored in the memory and controls various functions of the second verification apparatus 40. In particular, the memory in the control unit 508 stores a program which controls procedures of the first verification apparatus 30 described later with reference to FIG. 6.

Figures 6, 6A:
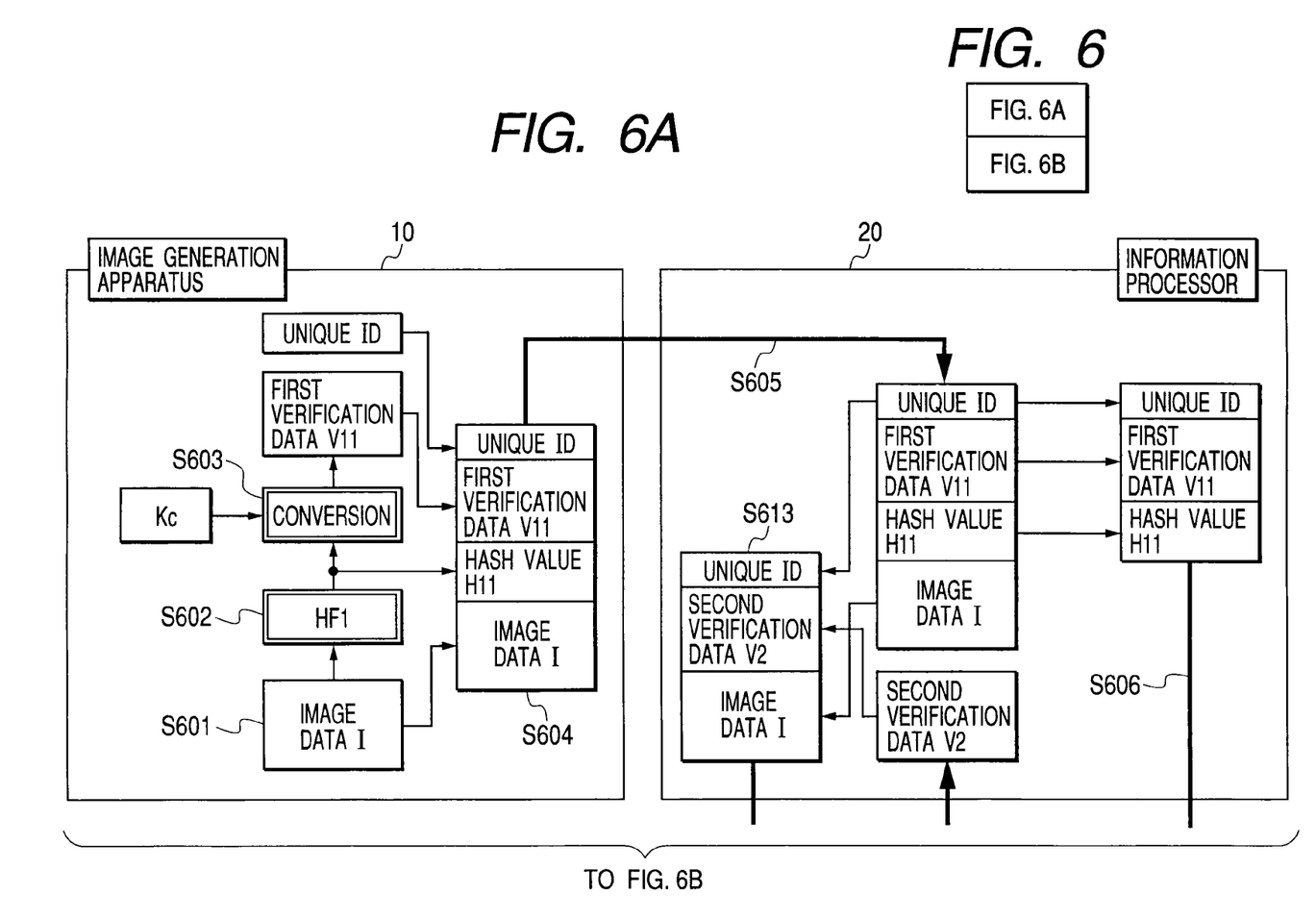
Figure 6B:
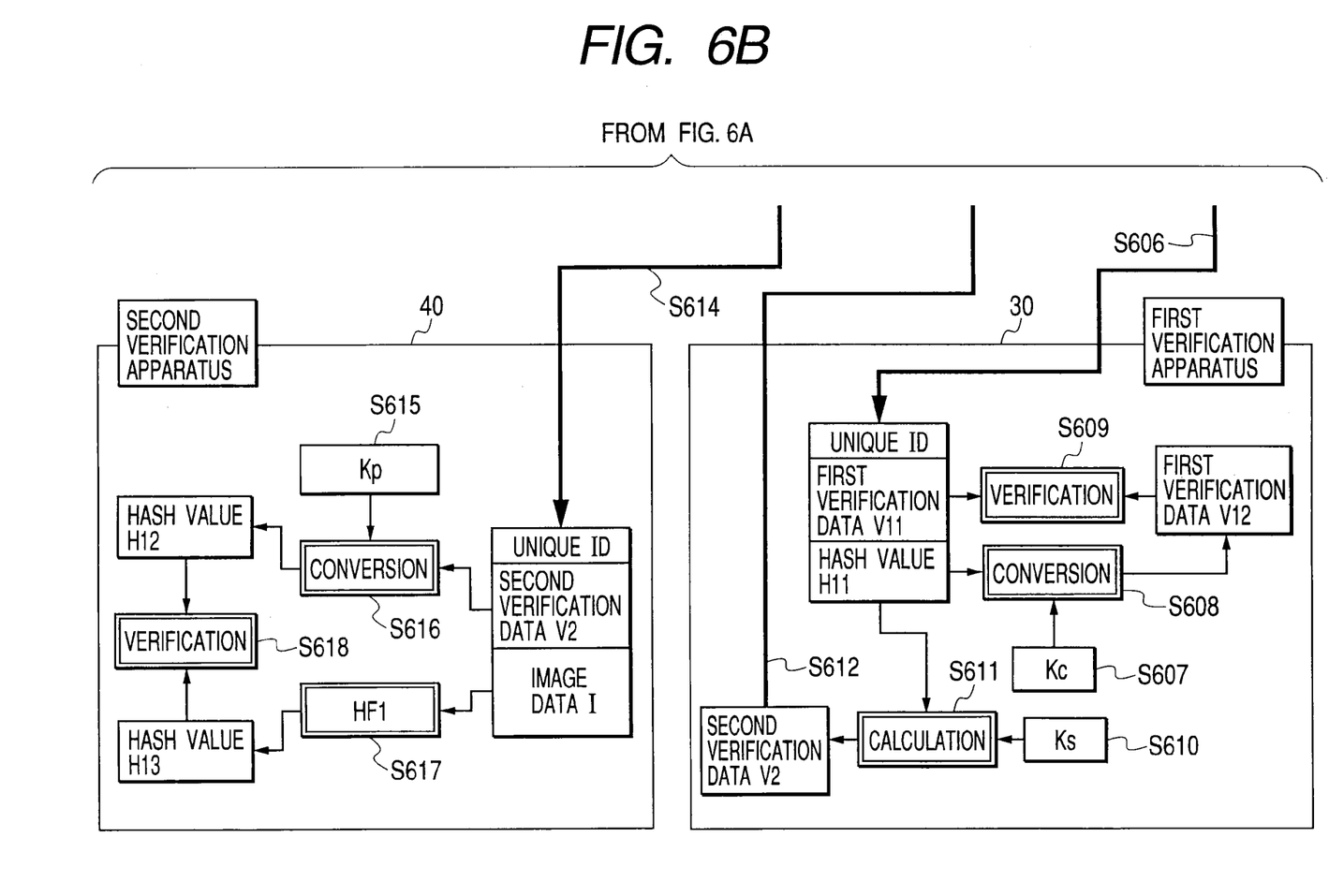

FIG. 6 is a diagram illustrating procedures of the image verification system according to this embodiment.

Step S601: The image generation unit 201 generates the image data I of a subject according to instructions from the user.

Step S602: The calculation unit 204 generates the hash value H11 of the image data I using the hash function HF1.

Step S603: The calculation unit 204 converts the hash value H11 into the first verification data V11 using the common information Kc obtained from the memory 203. The first verification data V11 is equivalent to MAC in the image data I.

Step S604: The image file-generating unit 206 generates the image file IF1 with first verification data, containing the image data I, the hash value H11, first verification data V11, additional information about the image data I, unique ID of the image generation apparatus 10, and other data. The media control unit 208 writes the image file IF1 into the removable medium 207.

Step S605: The user loads the image file IF1 stored on the removable medium 207 into the information processor 20 either directly from the removable medium 207 or via the interface unit 209. When loaded directly from the removable medium 207, the image file IF1 is read from the removable medium 207 and stored in the storage unit 302 by the media control unit 301. On the other hand, when loaded via the interface unit 209, the image file IF1 sent from the image generation apparatus 10 to the information processor 20 is received and stored in the storage unit 302 by the interface unit 309.

Step S606: To make the image file with first verification data verified by the first verification apparatus 30, the interface unit 304 sends the hash value H11, first verification data V11, and unique ID to the first verification apparatus 30. The interface unit 401 receives these data and stores them in the storage unit 402.

Step S607: With reference to the table T1 in the memory 403, the first calculation unit 404 acquires the common information Kc which corresponds to the unique ID obtained from the image file IF1.

Step S608: The first calculation unit 404 converts the hash value H11 into the first verification data V12 using the common information Kc obtained from the memory 403.

Step S609: The image verification unit 405 verifies whether the image data I has been altered, by comparing the first verification data V11 and first verification data V12.

If the two versions of the first verification data match (i.e., if integrity of the image data is verified), the image verification unit 405 detects that the image data I has not been altered. Also, the image verification unit 405 detects that the image data I has been generated by the image generation apparatus 10. Then, the first verification apparatus 30 informs the information processor 20 that the image data I has not been altered and starts generating second verification data.

On the other hand, if the two versions of the first verification data do not match (i.e., if integrity of the image data is not verified), the image verification unit 405 detects that the image data I has been altered. Then, the first verification apparatus 30 informs the information processor 20 that the image data I has been altered and prohibits generation of second verification data. In other words, the first verification apparatus 30 prohibits Step S610 and subsequent steps.

Step S610: If it is found that the image data I has not been altered, the second calculation unit 406 acquires the secret information Ks which corresponds to the unique ID, with reference to the table T1 in the memory 403.

Step S611: The second calculation unit 406 converts the hash value H11 into the second verification data V2 using the secret information Ks obtained from the memory 403. The second verification data V2 is equivalent to a digital signature in the image data I. The second verification data V2 generated by the second calculation unit 406 is stored in the storage unit 402.

Step S612: The interface unit 401 sends the second verification data V2 to the information processor 20. The interface unit 304 receives the second verification data V2 and supplies it to the file-generating unit 305.

Step S613: The image file-generating unit 305 generates the image file IF2 with second verification data, containing the image data I, second verification data V2, additional information about the image data I, unique ID and other data. The image file IF2 generated by the image file-generating unit 305 is stored in the storage unit 302.

Step S614: The interface unit 306 outputs the image file IF2 generated by the file-generating unit 305 to an external apparatus. On the other hand, the interface unit 501 receives the image file IF2 from the external apparatus and stores it in the storage unit 502.

Step S615: With reference to the table T2 in the memory 503, the calculation unit 504 acquires the public information Kp which corresponds to the unique ID obtained from the image file IF2.

Step S616: The calculation unit 504 converts the second verification data V2 into the hash value H12 using the public information Kp obtained from the memory 503.

Step S617: By using the hash function HF1, the calculation unit 504 generates the hash value H13 of the image data I obtained from the storage unit 502.

Step S618: By comparing the hash value H12 obtained in Step S616 and hash value H13 obtained in Step S617, the image verification unit 506 verifies whether the image data I has been altered.

If the two hash values match (i.e., if integrity of the image data is verified), the image verification unit 506 detects that the image data I has not been altered. Also, the image verification unit 506 detects that the image data I has been generated by the image generation apparatus 10. Then, the second verification apparatus 40 displays information that the image data I has not been altered, in the display unit 507.

On the other hand, If the two hash values do not match (i.e., if integrity of the image data is not verified), the image verification unit 506 detects that the image data I has been altered. Then, the second verification apparatus 40 displays information that the image data I has been altered, in the display unit 507.

As described above, the image verification system according to this embodiment can detect reliably whether or not the image data generated by the image generation apparatus 10 has been altered.

Also, since the image verification system according to this embodiment does not need to extensively improve the performance of the computational resources of the image generation apparatus 10, it can reduce the costs of the image generation apparatus 10.

Also, since the first verification apparatus 30 of the image verification system according to this embodiment verifies whether image data has been altered, by using the common information Kc obtained from the unique ID of the image generation apparatus 10, it can confirm whether or not the image data has been generated by the image generation apparatus 10.

Also, since the second verification apparatus 40 of the image verification system according to this embodiment verifies whether image data has been altered, by using the secret information Ks and public information Kp obtained from the unique ID of the image generation apparatus 10, it can confirm whether or not the image data has been generated by the image generation apparatus 10.

Also, the image verification system according to this embodiment implements the first verification apparatus 30 using an IC card (or a storage medium with a microprocessor) or a server computer with the information processor 20 operating as a client, it can thereby make the common information Kc and secret information Ks difficult to be analyzed or leaked and improve the security of the information.

Also, since the image verification system according to this embodiment sends a hash value (far smaller in data amount than image data) of image data rather than the image data itself from the information processor 20 to the first verification apparatus 30, it can decrease traffic between the information processor 20 and first verification apparatus 30, reduce memory requirements of the first verification apparatus 30, and radically slash processing time of the first verification apparatus 30.

Also, since the image verification system according to this embodiment generates image files with second verification data in the information processor 20 rather than in the first verification apparatus 30, it can reduce loads on the first verification apparatus 30 and costs of the first verification apparatus 30.

This embodiment can be implemented when a computer executes programs. Also, a recording medium, such as a CD-ROM, which contains the programs, a transmission medium, such as the Internet, which transmits the programs, or other means of supplying the programs to the computer can also constitute an embodiment of the present invention. The programs, recording media, and transmission media described above are also included in the scope of the present invention. As the storage medium, for example, a flexible disk, hard disk, optical disk, magneto-optical disk, CD-ROM, magnetic tape, non-volatile memory card, ROM, or the like may be used.

The above-described embodiments are merely exemplary of this invention, and are not to be construed to limit the scope of the present invention.

The scope of the present invention is defined by the scope of the appended claims, and is not limited to only the specific descriptions in this specification. Furthermore, all the modifications and changes belonging to equivalents of the claims are considered to fall within the scope of the present invention.

What is claimed is:

1. An image verification system comprising:
   a first verification apparatus that includes:
   (a) a first receiving unit operable to receive first verification data of image data and a first hash value generated from the image data;
   (b) a first verification unit operable to verify whether or not the image data is altered, using the first hash value, the first verification data, and a common key used in common key cryptography; and
   (c) a second verification data generation unit operable to generate second verification data from the first hash value if the first verification unit verifies that the image data is not altered, wherein the second verification data is generated from the first hash value using public key cryptography not using the common key cryptography; and
   a second verification apparatus that includes:
   (a) a second receiving unit operable to receive the second verification data and the image data; and
   (b) a second verification unit operable to verify whether or not the image data is altered, using a second hash value generated from the second verification data and a third hash value generated from the image data, wherein the second hash value is generated from the second verification data using the public key cryptography not using the common key cryptography,
   wherein the second verification apparatus is configured to inform a user that the image data is not altered if the second verification unit verifies that the image data is not altered, and
   wherein the second verification apparatus is configured to inform a user that the image data is altered if the second verification unit verifies that the image data is altered.

2. The image verification system according to claim 1, wherein the second verification data generation unit generates the second verification data from the first hash value using a secret key used in the public key cryptography.

3. The image verification system according to claim 1, wherein the second verification unit generates the second hash value from the second verification data using a public key used in the public key cryptography.

4. The image verification system according to claim 1,
   wherein the second verification data generation unit generates the second verification data from the first hash value using a secret key used in the public key cryptography, and
   wherein the second verification unit generates the second hash value from the second verification data using a public key used in the public key cryptography.

5. The image verification system according to claim 1, wherein the second verification data generation unit does not generate the second verification data from the first hash value if the first verification unit verifies that the image data is altered.

6. The image verification system according to claim 1, wherein the first verification apparatus is one of an IC card and a storage medium with a microprocessor.

7. The image verification system according to claim 1, wherein the first verification apparatus is a server computer that receives the first verification data and the first hash value from a client.

8. A method of verifying whether or not image data is altered, comprising:
   a first receiving step of receiving first verification data of the image data and a first hash value generated from the image data;
   a first verifying step of verifying whether or not the image data is altered, using the first hash value, the first verification data, and a common key used in common key cryptography;
   a second verification data generating step of generating second verification data from the first hash value if it is verified that the image data is not altered, wherein the second verification data is generated from the first hash value using public key cryptography not using the common key cryptography;
   a second receiving step of receiving the second verification data and the image data;
   a second verifying step of verifying whether or not the image data is altered, using a second hash value generated from the second verification data and a third hash value generated from the image data, wherein the second hash value is generated from the second verification data using the public key cryptography not using the common key cryptography;
   a first informing step of informing a user that the image data is not altered if it is verified that the image data is not altered; and
   a second informing step of informing a user that the image data is altered if it is verified that the image data is altered,
   wherein the first receiving step, the first verifying step, and the second verification data generating step are performed by a first verification apparatus, and
   wherein the second receiving step, the second verifying step, the first informing step, and the second informing step are performed by a second verification apparatus.

9. The method according to claim 8, wherein the second verification data is generated from the first hash value using a secret key used in the public key cryptography.

10. The method according to claim 8, wherein the second hash value is generated from the second verification data using a public key used in the public key cryptography.

11. The method according to claim 8,
    wherein the second verification data is generated from the first hash value using a secret key used in the public key cryptography, and
    wherein the second hash value is generated from the second verification data using a public key used in the public key cryptography.

12. The method according to claim 8, further comprising a step of controlling the first verification apparatus so as not to generate the second verification data from the first hash value if it is verified that the image data is altered.

13. The method according to claim 8, wherein the first verification apparatus is one of an IC card and a storage medium with a microprocessor.

14. The method according to claim 8, wherein the first verification apparatus is a server computer that receives the first verification data and the first hash value from a client.

* * * * *